March 22, 1966   D. A. E. MATTINGLY ETAL   3,241,304
PNEUMATIC BEARINGS AND FALSE TWISTERS
Filed Aug. 13, 1963   2 Sheets-Sheet 1
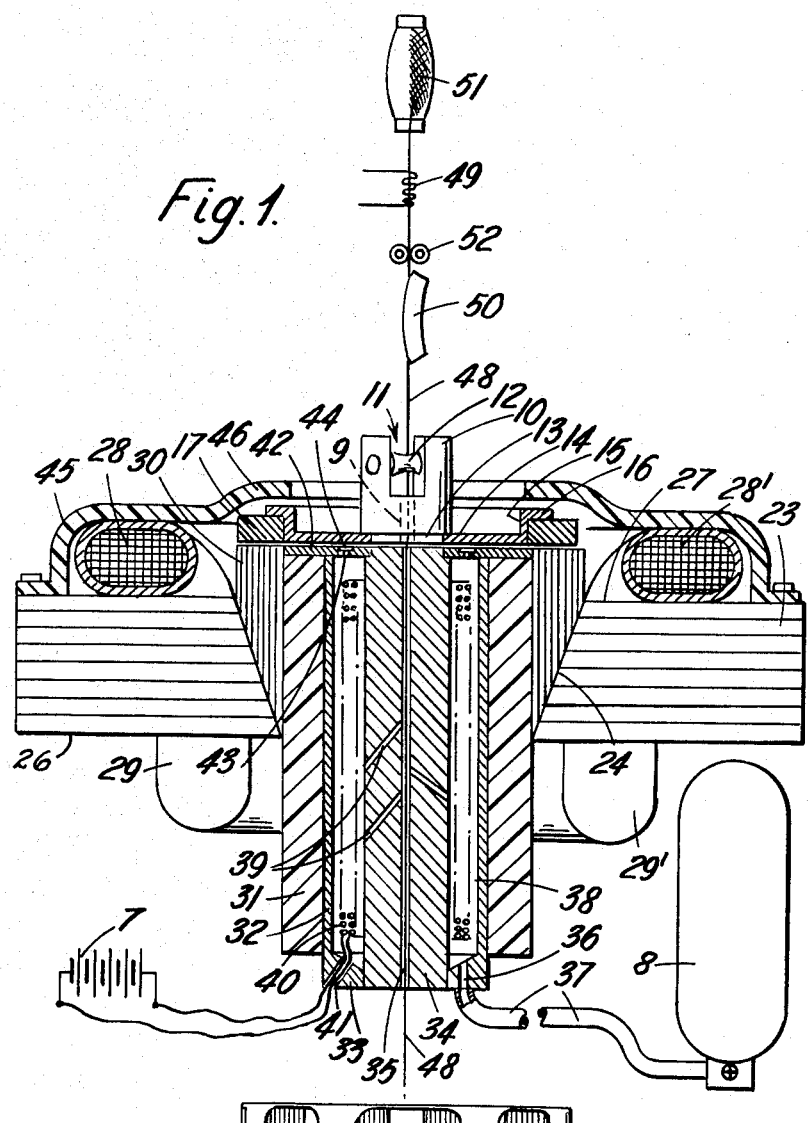
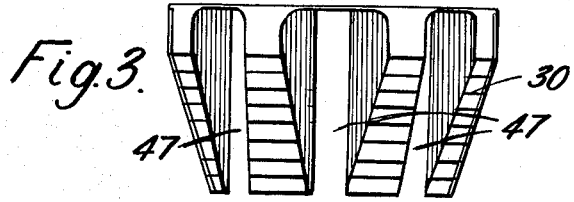
INVENTORS.
Denis Albert Edward Mattingly &
Reginald Selby Gilchrist,
BY Paul & Paul
ATTORNEYS.

March 22, 1966    D. A. E. MATTINGLY ETAL    3,241,304
PNEUMATIC BEARINGS AND FALSE TWISTERS
Filed Aug. 13, 1963    2 Sheets-Sheet 2
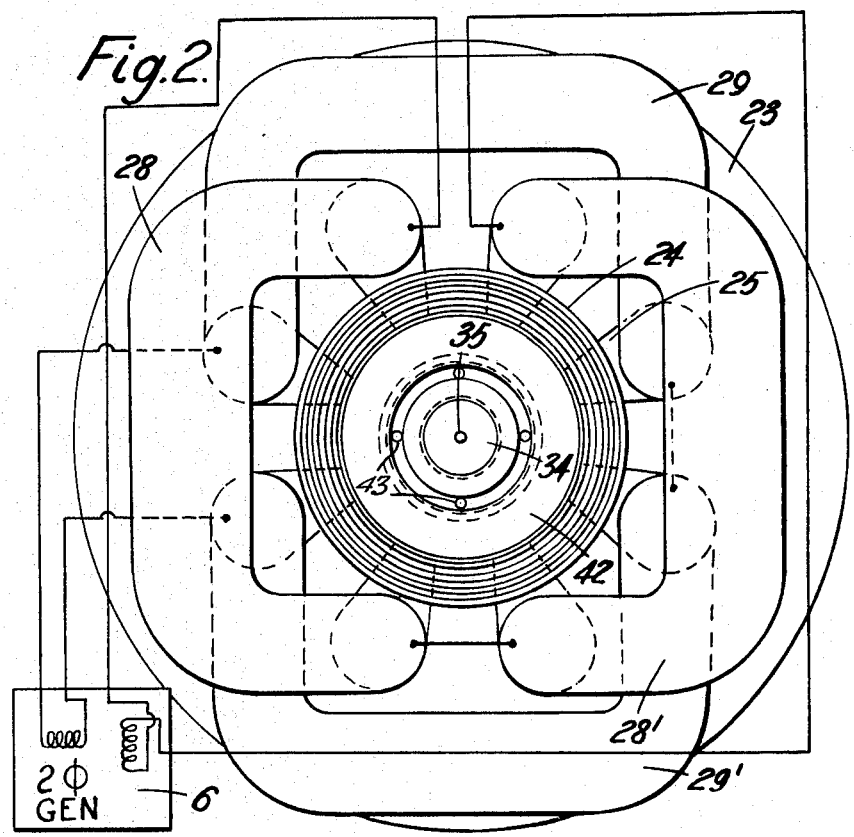
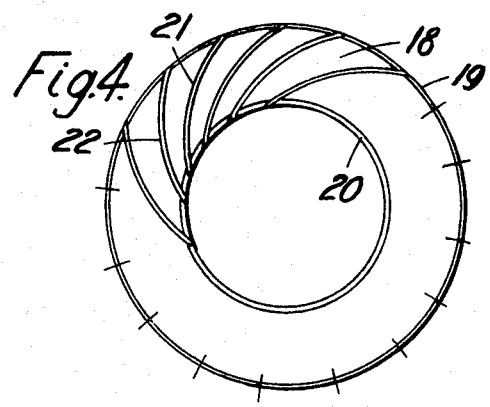
INVENTORS.
Denis Albert Edward Mattingly &
Reginald Selby Gilchrist,
BY Paul & Paul
ATTORNEYS.

United States Patent Office 3,241,304
Patented Mar. 22, 1966

3,241,304
PNEUMATIC BEARINGS AND FALSE TWISTERS
Denis Albert Edward Mattingly and Reginald Selby Gilchrist, London, England, assignors to The Klinger Manufacturing Company Limited, London, England, a British company
Filed Aug. 13, 1963, Ser. No. 301,836
Claims priority, application Great Britain, Aug. 14, 1962, 31,188/62
12 Claims. (Cl. 57—34)

This invention relates to pneumatic bearings of the kind in which means are provided for introducing a stream of air between the surfaces of two relatively movable parts so that it flows across the surfaces and away from said parts, whereby a cushion of air maintains said surfaces a short distance apart enabling a relative movement to take place between said parts with the minimum frictional drag.

According to this invention, a bearing comprises two relatively rotatable parts having opposed surfaces, means for introducing a stream of air between said surfaces so as to maintain them spaced apart, and additional means for limiting relative movement between said parts other than rotational movement.

The aforesaid additional means may be magnetic.

Preferably the opposed surfaces of said parts are substantially flat, and are at right angles to the axis of rotation.

One of said parts may be stationary and is provided with at least one air passage which breaks said flat surfaces of that part, whereby the air stream flows between the two flat surfaces in all directions.

With such an arrangment air flowing between the surfaces results, as is known, in the surfaces being drawn together but being prevented from contacting with one another by reason of the cushion of air between them.

The stationary part may be provided with an air chamber feeding a number of ports evenly spaced around the axis of rotation.

The ports may be arranged in the bottom of a circular groove concentric with the axis of rotation.

The aforesaid additional means limiting relative movement between said parts may be arranged to limit the movement of the rotating part both in a direction transversely to the axis of rotation, and in an axial direction.

At least one of the opposed surfaces may be shaped so that the stream of air flowing between the faces imparts relative rotation between them.

In an electric motor embodying the invention the aforesaid relatively rotatable parts may comprise the stator and rotor of the motor.

The stator may be shaped to provide a number of poles terminating in a flat end face and is provided with windings for connection with a source of alternating electric current so as to produce a rotating magnetic field, and said rotor may comprise a flat faced hysteresis member disposed opposite said flat end face of the stator, and which is rotated by said rotating field.

The stator may be annular in form and encircles an air chamber arranged for connection with a source of compressed air, and which air chamber is closed by a flat plate disposed opposite the flat face of the rotor and provided with at least one outlet for the compressed air.

A magnet may extend centrally through the air chamber and closure plate and has an end face disposed opposite the magnetic part of the rotor. The said magnet may be an electro-magnet.

The invention includes within its scope a false twisting apparatus embodying an electric motor as set out above, the twisting head being fixed to the rotating part of the motor.

The magnet may be formed with an axially extending passage and the rotor is provided with an opening leading to a passage in the twisting head, and in line with the passage in the magnet through which passages the yarn to be false twisted passes.

The rotor may comprise a magnetic disc on which is secured both the aforesaid hysteresis member and said twisting head, which latter is formed from magnetic material and disposed opposite the face of said magnet and thus constitutes additional means for attracting the rotor towards the stator.

A number of holes may be formed in the magnet so as to place the passage therein into communication with the air chamber.

In the case of an apparatus for false twisting and crimping yarn, the apparatus embodies a twist stopping device with or without tensioning means and a heater through which the yarn passes, and then through the passages in said magnet and twisting head, thus air flowing through the holes in the magnet into the passage therein cools the yarn shortly before reaching the twisting head which is an important factor in false twist crimping of yarn.

The following is a description of the invention as applied to a false twist crimping apparatus for yarn, reference being made to the accompanying drawings in which:

FIGURE 1 is a diagrammatic vertical section through the means for supporting and rotating the twisting spindle;

FIGURE 2 is a plan view of the stator;

FIGURE 3 is a side elevation of the centre laminated part of the stator; and

FIGURE 4 is a plan view of an alternative form of induction ring for the rotor.

The spinning head 10 is substantially of conventional form and comprises a cylindrical portion formed with a slot 11 across which extends a waisted pin or bale 12.

A reduced portion 13 of the head extends through a hole in the bottom 14 of a cup-shaped element in which it is fixed by riveting over the end of the reduced portion 13. The head 10 is formed from mild steel and the cup-shaped part is formed from aluminum. The portion 15 of the cup is outwardly flanged at 16. The rim portion is encircled by a hysteresis ring 17 which may either be formed in one piece from 3% cobalt steel or as shown in FIGURE 4 it may comprise a mild steel annulus 18, the inner and outer peripheries of which are encircled by copper rings 19 and 20. The underface of the annulus is formed with seventeen helical grooves 21 which also intersect the edges of the sleeves 19 and 20, and located in these helical grooves are copper conductors 22.

A hole 9 extends from the bottom of the slot 11 in the head to the underside of the reduced portion 13. The rotor thus formed is disposed opposite one end of a stator comprising the following parts.

A laminated annulus 23 of soft iron is formed with a conical hole 24 at the centre thereof, and eight slots 25 extend between two opposed faces 26, 27 of the laminated annulus 23 and inserted in these slots are two pairs of coils 28, 28' and 29, 29' (FIGURE 2) arranged for connection with a two phase source of alternating electric supply 6. The laminations of the annulus are bonded together by an epoxy resin such as is supplied under the registered trademark "Araldite." Secured firmly in the tapered holes 24 is a tapered laminated plug 30 formed by spirally winding a strip of soft iron the convolutions of the spiral strip being bonded together by epoxy resin of the kind set out above. The face of the tapered plug is formed with slots 47 which register with the aforesaid slots 25 in the annulus 23.

The plug 30 is similarly bonded to an insulating sleeve 31 formed from a plastics impregnated paper such as is supplied under the registered trademark "Tufnol."

The sleeve in its turn is bonded to a cylindrical air chamber 32 formed from mild steel. The bottom wall 33 of the chamber has fixed in it a magnetic core 34 having an axially extending passage 35. The bottom wall also communicates through a port 36 and supply conduit 37 with a source of compressed air 8. The core is such a size as to provide an annular space 38 between it and the wall of the air chamber and is provided with a number of small passages 39 through which air can enter the axial passage 35.

The core either comprises a permanent magnet, formed from a ferrous alloy, such as is supplied under the trade name "Alnico" or it may comprise a mild steel rod, in which case it is surrounded by a magnetizing coil 40. Electric conductors 41 for the coil extend out through the hole in the bottom wall 33 of the air chamber in an airtight manner, for connection with a source of direct current supply 7. The coil is so wound that it does not fill the space between the core and the wall of the air chamber so as not to interfere with the flow of compressed air up to the top of the air chamber.

Extending over the top of the air chamber 32 and sleeve 31 is a disc 42 formed from non-magnetic metal such as unmagnetized stainless steel or brass, or formed from plastics, and which disc is provided with at least three uniformly disposed holes 43, the upper ends of which terminate in a circular channel 44 so that a uniform cushion of air is formed between the disc and the aforesaid rotor made up of the cup-shaped part 14, 15 and the ring 17, which cushion of air is maintained by the supply of compressed air passing up between the core and the air chamber and out through the holes 43, and channel 44. Furthermore, it will be seen that the inclined passages 39 together form a means for directing compressed air through bore 35 into the area where the cushion of air is maintained, so that in this way not only is the yarn cooled during its movement through the passage 35, but in addition the direction of flow of compressed air through the passage 35 toward the air cushion opposes a drop of air pressure at the stream of air which forms the air cushion.

The axes of the holes 43 may be so disposed that the air leaving the channel 44 has a circumferential component in a direction to assist in the rotation of the rotor, and the underface of the bottom 14 of the cup-shaped part may be formed with grooves for receiving the streams of air so as also to assist in its rotation.

The parts of the laminated annulus 23 between the grooves 25 form pole pieces as do the parts between the grooves in the tapered plug 30 and a rotating field is thus formed which draws around with it the hysteresis ring 17 or the annulus 18 shown in FIGURE 4 when such is employed, and in this latter arrangement electric current is induced in the wires 22 thereby increasing the torque transmitted.

The magnetic field tends to centralise the rotor as does also the magnetic core 34. The magnetic field also tends to draw the rotor down towards the end face of the plug 30 and the core 34, but this force is overcome by the pressure of the cushion of air between the cup-shaped part 14 and the disc 42. In this manner the very little resistance to rotation of the rotor takes place.

In order to avoid any risk of the rotor flying clear of the assemblage a cover plate 45 is secured to the laminated annulus 23 and has a part 46 which overlies the rotor.

The yarn 48 after leaving a bobbin 51 passes in known manner through a tensioning device 49 through twist stopping means in the form of nip rollers 52, and over a heater 50 and thence through the passage 35 and through the registering passage 9 in the head 10. Thus the yarn may be cooled by the air passing into the passage 35 through the passages 39.

We claim:
1. A bearing comprising two relatively rotatable parts having opposed substantially congruent surfaces transverse the axis of rotation of said relatively rotatable parts, said opposed surfaces of said parts being substantially flat and at right angles to the axis of rotation, means for introducing a stream of air between said surfaces so as to maintain them in spaced reltionship, and magnetic means for limiting axial and radial relative movement between said parts, and one of said parts being stationary and being provided with an air chamber feeding a number of ports evenly-spaced around the axis of rotation.

2. A bearing according to claim 1 wherein said stationary part has a circular groove therein and said ports are arranged in the bottom of the circular groove and concentric wtih the axis of rotation.

3. An electric motor having a rotor and a stator, and embodying a bearing comprising two relatively rotatable parts having opposed substantially congruent surfaces transverse the axis of rotation of said relatively rotatable parts, means for introducing a stream of air between said surfaces so as to maintain them in spaced relationship, and magnetic means for limiting axial and radial relative movement between said parts, said relatively rotatable parts comprising respectively portions of the stator and rotor of the motor, the stator being shaped to provide a number of holes terminating in a flat end face and which stator is provided with windings for connection with a source of alternating electric current so as to produce a rotating magnetic field, and wherein said rotor comprises a flat faced hysteresis member disposed opposite said flat end face of the stator.

4. An electric motor according to claim 3 wherein said stator is annular in form and has an air chamber therein arranged for connection with a source of compressed air, the air chamber being closed by a flat plate forming the flat end face of the stator and disposed opposite the flat face of the rotor and provided with at least one outlet for the compressed air.

5. An electric motor according to claim 4 wherein said magnetic means includes a magnet extending centrally through the air chamber and closure plate and having an end face disposed opposite a magnetic part of the rotor.

6. An electric motor according to claim 5 wherein said magnet is an electro magnet.

7. A false twisting apparatus embodying an electric motor having a rotor and a stator and embodying a bearing comprising two relatively rotatable parts having opposed substantially congruent surfaces transverse the axis of rotation of said relatively rotatable parts, means for introducing a stream of air between said surfaces so as to maintain them in spaced relationship, said relatively rotatable parts comprising respectively portions of the stator and rotor of the motor, a twisting head fixed to the rotor of the motor, and an elongated member formed with a bore communicating with the air between said surfaces and through which yarn is guided, means communicating on the one hand with said means for introducing said stream of air and one the other hand with said bore for directing into the latter air in a direction which flows through said bore to said stream of air between said surfaces, so that the air introduced into said bore will on the one hand cool the yarn while on the other hand the air flows in said bore toward said stream of air between said surfaces to oppose a drop of pressure in the air between said surfaces.

8. A false twisting apparatus embodying an electric motor having a rotor and a stator and embodying a bearing comprising two relatively rotatable parts having opposed substantially congruent surfaces transverse the axis of rotation of said relatively rotatable parts, means for introducing a stream of air between said surfaces so as to maintain them in spaced relationship, and magnetic means for limiting axial and radial movement between said parts, said relatively rotatable parts comprising respectively portions of the stator and rotor of the motor, a twisting head fixed to the rotor of the motor, the stator of the motor being annular in form and including a flat closure plate having a number of holes, said stator having an air chamber therein for connection to a source of compressed air, a magnet extending centrally through the air chamber and through said closure plate at the end of the air chamber, the magnet having an end face disposed opposite a magnetic part of the rotor and being formed with an axially extending passage, and the rotor being provided with an opening leading to a passage in the twisting head and in line with the passage in the magnet through which passages a yarn to be false twisted passes.

9. A false twisting apparatus according to claim 8 wherein the rotor includes a non-magnetic disc and a hysteresis member secured thereto, said twisting head being formed from magnetic material and being disposed opposite the face of said magnet.

10. A false twisting apparatus according to claim 9 wherein the magnet is formed with a number of holes therein so as to place the passage therein into communication with the air chamber.

11. An apparatus for false twisting and crimping a yarn comprising a tensioning device, a heater through which the yarn is drawn, an electric motor having a stator shaped to provide a number of holes terminating in a flat end face and which stator is provided with windings for connection with a source of alternating electric current supply so as to produce a rotating magnetic field, the motor having a rotor comprising a flat faced hysteresis member disposed opposite the flat end face of the stator and which stator is annular in form and has an air chamber therein arranged for connection with a source of compressed air, the air chamber being provided with a flat closure plate forming the flat end face of the stator and disposed opposite the flat face of the rotor, and a magnet extending centrally through the air chamber and through said closure plate and having an end face opposite the flat face of the rotor, the magnet being formed with an axially extending passage, and said rotor comprising a non magnetic disc on which is secured said hysteresis member and a centrally disposed twisting head formed from magnetic material disposed opposite the end of the magnet and having a passage therein in line with the passage in the magnet through which passages the yarn extends.

12. An apparatus for false twisting and crimping a yarn comprising a tensioning device, a twist stopping device, a heater through which the yarn is drawn, an electric motor having a stator shaped to provide a number of holes terminating in a flat end face, the stator being provided with windings for connection with a source of alternating electric current supply so as to produce a rotating magnetic field, the motor having a rotor comprising a flat faced hysteresis member disposed opposite the flat end face of the stator, the stator being annular in form and having an air chamber arranged therein for connection with a source of compressed air, the air chamber being provided with a flat closure plate forming the flat end face of the stator and disposed opposite the flat face of the rotor, and a magnet extending centrally through the air chamber and through said closure plate and having an end face opposite the flat face of the rotor, the magnet being formed with an axially extending passage, and said rotor comprising a non magnetic disc on which is secured said hysteresis member and a centrally disposed twisting head formed from magnetic material disposed opposite the end of the magnet and having a passage therein in line with the passage in the magnet through which passages the yarn extends.

References Cited by the Examiner

UNITED STATES PATENTS

| | | | |
|---|---|---|---|
| 2,790,298 | 4/1957 | Kunzle | 57—34 |
| 2,863,277 | 12/1958 | Boillat et al. | 57—77.45 X |
| 2,889,474 | 6/1959 | Macks | 310—90 |
| 2,937,294 | 5/1960 | Macks | 310—90 |
| 2,951,729 | 9/1960 | Skarstrom. | |
| 2,990,674 | 7/1961 | Stoll et al. | 57—101 X |
| 3,105,164 | 9/1963 | Favrot | 57—77.3 X |
| 3,123,969 | 3/1964 | Noordenbos | 57—77.45 |
| 3,183,384 | 5/1965 | Flaherty et al. | 310—90 |

FOREIGN PATENTS

| | | |
|---|---|---|
| 199,548 | 9/1958 | Austria. |
| 854,730 | 11/1952 | Germany. |
| 894,845 | 4/1962 | Great Britain. |

MERVIN STEIN, *Primary Examiner.*